United States Patent [19]

Clarke

[11] 4,286,877

[45] Sep. 1, 1981

[54] REFRACTIVELY SCANNED INTERFEROMETER

[75] Inventor: William L. Clarke, South Laguna, Calif.

[73] Assignee: Laser Precision Corporation, Irvine, Calif.

[21] Appl. No.: 61,010

[22] Filed: Jul. 26, 1979

[51] Int. Cl.³ .............................................. G01B 9/02
[52] U.S. Cl. ................................................... 356/346
[58] Field of Search ........................................ 356/346

[56] References Cited

U.S. PATENT DOCUMENTS

| 4,084,907 | 4/1978 | Pinard | 356/346 |
| 4,165,938 | 8/1979 | Doyle | 356/346 |

OTHER PUBLICATIONS

Ring, J., and J. W. Schofield, "Field-Compensated Michelson Spectrometers", Applied Optics, vol. 11, No. 13, Mar. 1972, pp. 507–516.

Griffiths, P. R., Chemical Infrared Fourier Transform Spectroscopy, pp. 127–131.

Jenkins, and White, Fundamentals of Optics, pp. 244–255.

Bouchareine, and Connes, "Communications a la Societe Francaise de Physique", Le Journal de Physique et le Radium, vol. 24, p. 124.

*Primary Examiner*—Conrad J. Clark
*Attorney, Agent, or Firm*—Thomas J. Plante

[57] ABSTRACT

A refractively scanned interferometer, of the type in which a wedge-shaped prism is moved across one interferometer arm for scanning purposes, in which both the substrate of the beamsplitter and the scanning wedge are optically compensated for by substantially identical elements in the other arm of the interferometer.

12 Claims, 1 Drawing Figure

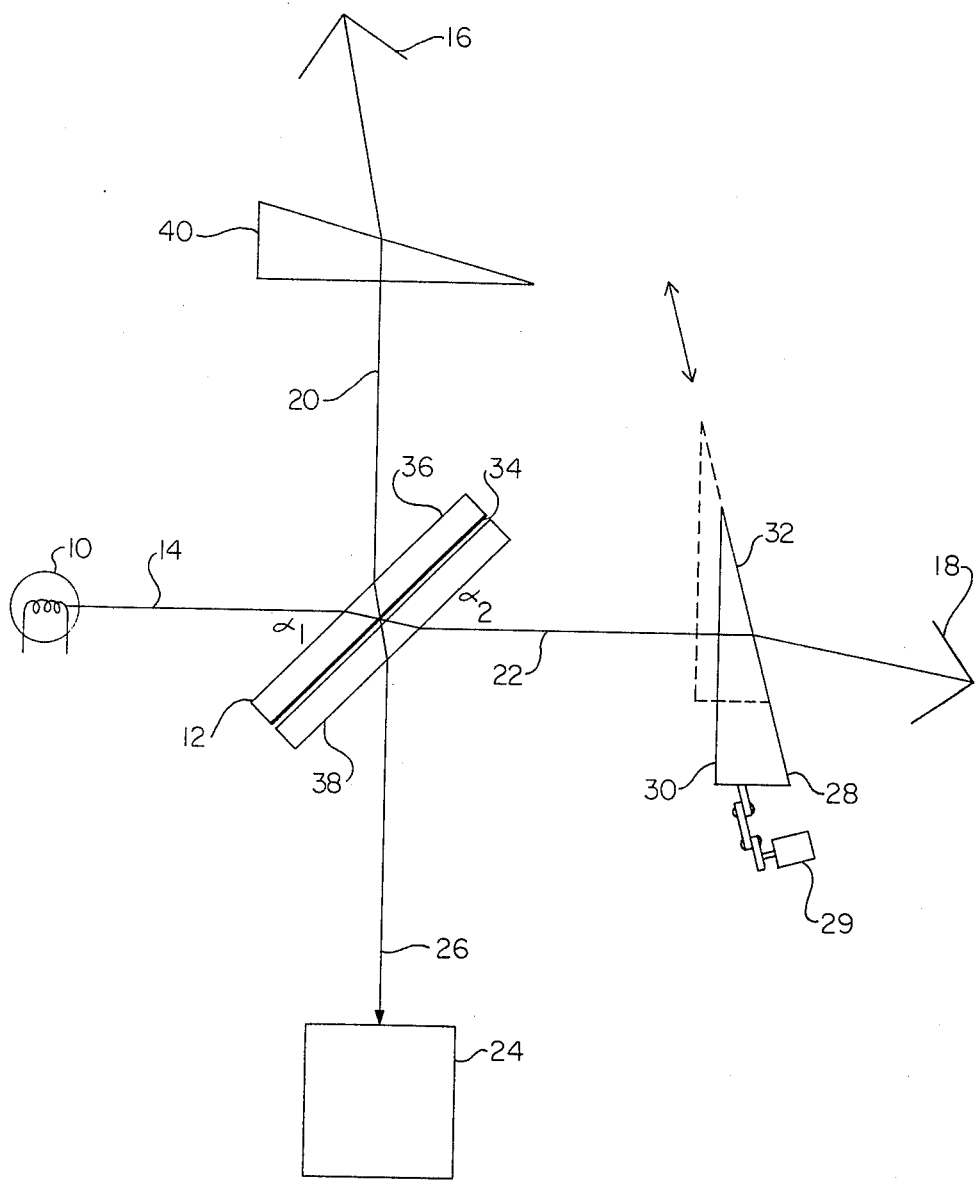

REFRACTIVELY SCANNED INTERFEROMETER

BACKGROUND OF THE INVENTION

This invention relates to the field of interferometry, and particularly to scanning interferometers intended for use in spectrometry. More specifically, its primary focus is on improving Michelson interferometers intended for use in infrared Fourier transform spectroscopy.

The present invention is an improvement relating to the same general subject matter as two earlier filed applications of Walter M. Doyle, assigned to the assignee of this application. The first of the related Doyle applications is Ser. No. 790,497, filed Apr. 25, 1977, and titled "Refractively Scanned Interferometer". That application discloses and claims an interferometer having stationary reflectors at the end of each interferometer "arm" combined with a wedge-shaped prism movable across one arm to cause scanning.

The other of the related Doyle applications is Ser. No. 808,951, filed June 22, 1977, and also titled "Refractively Scanned Interferometer". That application discloses and claims an interferometer of the same type as Ser. No. 790,497, wherein the orientation and direction of motion of the wedge-shaped scanning prism are such that displacement of the refracted optical beam by the prism is minimized or eliminated.

The interferometers shown in the cited Doyle applications have provided a significant development in the field of Fourier transform spectroscopy. However, certain performance limitations have become apparent in those interferometers, which I attribute to certain optical aberrations not fully compensated for in the Doyle interferometers.

There are three general types of optical aberration encountered in apparatus of this type: (a) chromatic aberration, (b) spherical aberration, and (c) astigmatic aberration.

Chromatic aberration is partially compensated for in the Doyle apparatus by the use of corner reflectors. However, the compensation is only partial, and, further, there is an upper limit in such apparatus on the allowable distance between the scanning wedge and the corner reflector in the same arm. This limit in some cases is not acceptable.

Spherical aberration is minimized in the Doyle apparatus by matching the refractive thickness of the beamsplitter substrate to the refractive thickness of the scanning wedge in its centered position. In other words, the arrangement is such as to equalize the average optical path lengths in those two elements, which are located in different arms of the interferometer. While this arrangement, as predicted by Doyle, provides a reasonable solution of the spherical aberration problem, it tends to preclude solution of the astigmatism problem, for reasons which will be more fully discussed below.

Astigmatic aberration (astigmatism) was not compensated for in the apparatus of the Doyle applications, although it was later discovered that first order terms could be compensated for by a lateral displacement of one of the corner reflectors. Nevertheless, astigmatism has provided to be a limiting factor in the performance of the Doyle apparatus.

The general purpose of the present invention is to retain the significant advantages of the Doyle apparatus, while adding thereto the benefits of maximum compensation for, or balancing of, the three types of optical aberration.

SUMMARY OF THE INVENTION

The present invention provides compensation for astigmatism by balancing the refractive effect of the beamsplitter with an equal and angularly identical refractive effect in the other arm of the interferometer.

Since this removes the Doyle solution to the spherical aberration problem, the present invention provides a refractive element which compensates for, or balances, the refractive effect of the movable prism, and which is located in the interferometer arm other than the one having the movable prism. The balancing prism is stationary, and is preferably substantially identical in shape to the movable prism. With this arrangement, in addition to solving the spherical aberration problem, an improved solution of the chromatic aberration problem is provided.

The net result of the foregoing changes is to provide interferometer arms which are fully symmetrical in centered position, i.e., which are so constituted as to be "mirror images" of one another.

BRIEF DESCRIPTION OF THE DRAWING

The FIGURE is a diagrammatic plan view of an interferometer incorporating the present invention.

DETAILED DESCRIPTION OF THE SPECIFIC EMBODIMENT

First, the elements which are included in the Doyle applications will be described, and then a detailed analysis will be made of the aberration problems and solutions provided by the present invention.

The Doyle apparatus includes essentially a light source 10, a beamsplitter 12 tilted at a 45° angle to the radiation beam 14, two stationary reflectors 16 and 18 located at the ends of the two interferometer "arms" to reflect the "split" radiation beams 20 and 22, respectively, a detector 24 which receives the recombined radiation 26, and a movable wedge-shaped prism 28 which moves across the path of beam 22 to cause refractive scanning, suitable driving means 29 being provided to cause the movement of prism 28 back and forth across the radiation path. The stationary reflectors 16 and 18 are retro-reflectors, because of significant functional benefits, even though some of their benefits are provided by the optical compensation features added by the present invention. The retro-reflectors 16 and 18 are shown as "cube corner" reflectors; but other types of retro-reflectors, i.e., "cats-eye" reflectors, or "rooftop" reflectors, may be used.

For the reasons taught by Doyle application Ser. No. 808,951, it is important that the direction of scanning motion and the orientation of the prism 28 be such that the apparent deflection point of the optical beam passing through the prism remains at substantially the same position throughout scanning motion of the prism. The arrow in the FIGURE shows the appropriate direction of scanning motion of the prism 28 for the configuration shown. And the dashed lines illustrate one of the positions to which the prism moves as a result of its translatory motion. Because beam 22 enters prism 28 at right angles to front surface 30 of the prism, it is not angularly deflected until it emerges from the rear surface 32 of the prism. Since scanning motion is along the line defined by rear surface 32 of the prism, the apparent deflection point of beam 22, and the apparent deflection points of the parallel rays therein, remain at the same point(s) as the prism 28 is moved for scanning purposes. Different shapes of prism 28 and different orientations with respect to the entering beam 22 would require different directions of translatory motion in order to meet the stated condition.

With only the elements thus far described, my experience indicates that astigmatic aberrations are produced which constitute a significant limiting factor in performance of the apparatus.

Astigmatic aberration is caused primarily by the angular orientation of the refractive portion of the beamsplitter 12. The partially reflective, partially transmitting surface of the beamsplitter is shown at 34. This is the functioning surface of the beamsplitter. Since it must, of necessity, be supported by a substrate, or plate, portion 36, which could be provided on either side of surface 34, the substrate 36 unavoidably injects a refractive factor into the apparatus. Because the beamsplitter, by its very nature, has to be oriented at an angle, generally 45°, to the radiation 14 from source 10, the substrate 36 constitutes a refractive element tilted at an angle to the direction of propagation, thereby introducing asymmetrical distortion, or astigmatism, into the optical system.

In a conventional, or non-refractive, interferometer, adjusted for equal path lengths, the field-of-view (FOV) is in principle not limited by lateral coherence effects. As the length of one of the arms is varied away from this condition, the coherent FOV will be reduced due to the joint dependence of phase on both arm length and angle of propagation. The foregoing reference to conventional interferometers means those in which the length of the variable-length radiation path is changed by moving the reflector in one of the interferometer arms; whereas interferometers following the teachings of the Doyle applications may be conveniently referred to as refractive interferometers, because the length of the variable-length radiation path is changed by movement of the refractive element across one of the interferometer arms.

Refractive interferometers have a similar FOV phenomenon, requiring the refractive path lengths in the two arms to be mutually compensating. In the earlier refractive interferometers, second order effects of this type were compensated by making the optical path length in the beamsplitter equal to the average optical path length in the wedge. Recently, however, an analysis of lateral coherence effects has been performed which indicates that the prior approach is probably not adequate.

In order to solve this problem, it is necessary to compensate for the beamplitter substrate 36 with a similar element in the other arm of the interferometer. This compensating element should have the same refractive effect as substrate 36, and it should be so oriented with respect to the optical path as to provide the same 45° angle of intersection of the radiation path. Such a compensating element is shown in the FIGURE at 38. Although the overall refractive effect is what needs to be balanced by compensating element 38, it is preferable that it have the same refractive index and the same thickness as substrate 36, as well as having the same angular orientation. If desired, the beamsplitter surface 34 could be placed on the element 38 as a substrate, instead of the element 36. As shown in the FIGURE, the elements 36 and 38 are parallel, and the angles $\alpha 1$ and $\alpha 2$ are both 45°.

The inclusion of the beamsplitter compensating element 38 in the variable-length arm of the interferometer creates an imbalance of the refractive path lengths in the two arms because of the presence of refractive scanning element 28. In order to meet the spherical aberration problem created by this imbalance, I propose the inclusion of a compensating element in the fixed-length interferometer arm, which, in centered position of the interferometer, will provide a refractive path equal to the radiation path length through the prism 28. While this solution of the spherical aberration problem could be accomplished by a plate having a uniform optical thickness equal to the average optical path length in prism 28, it is preferable to use a wedge-shaped prism 40, having the same shape as prism 28, and oriented toward the fixed-length optical path in the same way that prism 28 is oriented toward the variable-length optical path. Spherical aberration tends to create different curvatures of the radiation wavefronts at the detector, resulting in a distortion balanced around the system axis. Matching the optical path lengths in the two interferometer arms, in centered position, is the appropriate solution of the problem.

The use of a compensating prism 40 which matches prism 28 has the additional benefit of providing complete balancing of chromatic dispersion in the two arms of the interferometer, thereby providing a more complete solution of the chromatic aberration problem than would be provided solely by the use of retro-reflectors. Chromatic aberration results from a non-flat wavefront, due to the wavelength-dependent refractive index which determines the amount of bending of the light rays as they pass through the prism 28. Balancing this effect with the matching prism 40, preferably located in the other arm of the interferometer from scanning prism 28, is the best solution of the chromatic aberration problem.

Compensating prism 40 is stationary, and it should be located at the same position with respect to its arm of the interferometer as the position of the prism 28 with respect to its arm of the interferometer. This means that the distance of compensating, or balancing, prism 40 from reflector 16 should be the same as the distance of movable prism 28 from reflector 18 when prism 28 is in its centered position.

From the foregoing description, it can be seen that the best results, in terms of avoidance of spherical, astigmatic and chromatic aberrations, in an interferometer of the refractive type, can be obtained by providing completely symmetrical interferometer arms, in which both the beamsplitter substrate and refractive wedge are fully compensated for, or balanced, in the other arm of the interferometer. With this fully symmetrical arrangement, the interferometer will have no limit on FOV when prism 28 is at centered position.

Although the primary solution of the chromatic aberration problem is provided by the stationary balancing prism 40, it is still highly desirable, and in fact necessary, to use retro-reflectors 16 and 18. The retro-reflectors are considered necessary because the wedge-shaped prisms, if flat reflective mirrors were used, would create a dispersion of rays which, while identical in the two arms, would be too broadly dispersed at the detector 24. Additionally, the retro-reflectors provide several advantages; and, because they are both stationary, there is no problem due to their relative bulk. For one thing, they tend to compensate for any chromatic aberration due to imperfect matching of the two wedge-shaped prisms 28 and 40. Use of the retro-reflectors also makes the optical system less vulnerable to problems due to slight misalignment of the wedge-shaped scanning prism 28. In other words, use of retro-reflectors reduces sensitivity to angular errors of the wedge motion. Furthermore, the retro-reflectors tend to compensate for astigmatism in the system. And finally, the retro-reflectors provide a preferred approach to dual beam, i.e., dual detector, spectroscopy, as discussed in Doyle application Ser. No. 790,457, and also in a Doyle application titled "Dual Beam Fourier Spectrometer", Ser. No. 830,576, filed Sept. 6, 1977.

It should also be noted that the use of a dual beam spectrometer of the type disclosed in Ser. No. 830,576, is rendered more feasible by the increased FOV due to the full optical compensation provided by the present application.

The interrelation of the various optical features of the present invention is significant in providing the desired accuracy of the complete apparatus. As explained in Doyle application Ser. No. 808,951, the orientation and direction of motion of the scanning wedge 28 are of particular importance where retro-reflectors are used. And, as outlined above, the retro-reflectors contribute to solution of the aberration problems; and their use is made feasible by the fact that scanning is accomplished by wedge 28 and not by movement of one of the reflectors. Given the foregoing facts, it becomes desirable in balancing out the aberration problems to compensate for both the beamsplitter and the scanning wedge, as detailed above.

The following claims are intended not only to cover specific embodiments disclosed, but also to cover the inventive concepts explained herein with the maximum breadth and comprehensiveness permitted by the prior art.

I claim as my invention:

1. A spectral analysis interferometer, of the type having diverging arms along which radiation is directed, comprising:
    a beamsplitter for directing radiation from a source in optical paths along the two diverging arms of the interferometer, said beamsplitter including a partially reflecting surface which divides radiation between the interferometer arms, and a supporting substrate for said surface which tends to create an optical imbalance between the arms of the interferometer.
    a first stationary reflector at the end of the first interferometer arm;
    a second stationary reflector at the end of the second interferometer arm;
    a scanning prism in one of the interferometer arms which is movable across that arm to vary the length of the optical paths in that arm; and
    compensating means for avoiding aberrations due to the refractive characteristics of both the beamsplitter substrate and the scanning prism, said compensating means providing refractive effects in the other arm of the interferometer which substantially balance the refractive effects of the beamsplitter substrate and of the scanning prism in its centered position.

2. The spectral analysis interferometer of claim 1 wherein the scanning prism is so oriented and has such a direction of movement across the optical path that the apparent deflection point of the optical beam passing through the scanning prism remains at substantially the same position throughout the motion of the scanning prism.

3. The spectral analysis interferometer of claim 1 or claim 2 wherein the first and second stationary reflectors are retro-reflectors.

4. The spectral analysis interferometer of claim 1 or claim 2 wherein the compensating means includes a refractive element for balancing the refractive effect of the beamsplitter substrate, said element being in the other arm of the interferometer from said substrate, and having the same refractive thickness as said substrate and the same angular orientation to its optical path as said substrate has to its optical path.

5. The spectral analysis interferometer of claim 3 wherein the compensating means includes a refractive element for balancing the refractive effect of the beamsplitter substrate, said element being in the other arm of the interferometer from said substrate, and having the same refractive thickness as said substrate and the same angular orientation to its optical path as said substrate has to its optical path.

6. The spectral analysis interferometer of claim 1 or claim 2 wherein the compensating means includes a refractive element for balancing the refractive effect of the scanning prism, said element being in the other arm of the interferometer from said prism, and having the same shape as said prism and the same location in its arm of the interferometer as said prism has in its arm of the interferometer.

7. The spectral analysis interferometer of claim 3 wherein the compensating means includes a refractive element for balancing the refractive effect of the scanning prism, said element being in the other arm of the interferometer from said prism, and having the same shape as said prism and the same location in its arm of the interferometer as said prism has in its arm of the interferometer.

8. The spectral analysis interferometer of claim 4 wherein the compensating means includes a refractive element for balancing the refractive effect of the scanning prism, said element being in the other arm of the interferometer from said prism, and having the same shape as said prism and the same location in its arm of the interferometer as said prism has in its arm of the interferometer.

9. A spectral analysis interferometer, of the type having diverging arms along which radiation is directed, comprising:
    a first stationary reflector at the end of the first interferometer arm;
    a second stationary reflector at the end of the second interferometer arm;
    a movable wedge-shaped prism in one of the interferometer arms which is moved across the optical path in that arm to cause spectral scanning; and
    a stationary wedge-shaped prism in the other arm of the interferometer which balances the optical effects of the movable prism when the latter is in its centered position, thereby tending to avoid optical aberrations in the interferometer.

10. A spectral analysis interferometer, of the type having diverging arms along which radiation is directed by a beamsplitter surface on a supporting substrate, comprising:
    a first stationary reflector at the end of the first interferometer arm;
    a second stationary reflector at the end of the second interferometer arm;

a movable wedge-shaped prism in one of the interferometer arms which is moved across the optical path in that arm to cause spectral scanning;

a stationary wedge-shaped prism in the other arm of the interferometer which balances the optical effects of the movable prism when the latter is in its centered position, thereby tending to avoid optical aberrations in the interferometer; and a refractive element in the other arm from the beamsplitter substrate which balances the optical effects of said substrate, thereby tending to avoid optical aberrations in the interferometer.

11. The spectral analysis interferometer of claim 9 or claim 10 wherein the first and second stationary reflectors are retro-reflectors.

12. The spectral analysis interferometer of claim 9 or claim 10 wherein the movable wedge-shaped prism is so oriented and has such a direction of movement across the optical path that the apparent deflection point of the optical beam passing through the movable prism remains at substantially the same position throughout the scanning movement of the prism.

* * * * *